US012276930B2

(12) United States Patent
Majima et al.

(10) Patent No.: US 12,276,930 B2
(45) Date of Patent: Apr. 15, 2025

(54) IMAGE FORMING APPARATUS THE CONTROLS OPERATION DEPENDING ON WHETHER SHOW-THROUGH OF SHEET IS DETECTED

(71) Applicant: KYOCERA Document Solutions Inc., Osaka (JP)

(72) Inventors: Tatsuya Majima, Osaka (JP); Kenji Miyamoto, Osaka (JP); Takahiro Honda, Osaka (JP); Hiroyuki Yamaguchi, Osaka (JP); Hideo Taketani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/243,890

(22) Filed: Sep. 8, 2023

(65) Prior Publication Data

US 2024/0085837 A1 Mar. 14, 2024

(30) Foreign Application Priority Data

Sep. 13, 2022 (JP) ................................. 2022-145594

(51) Int. Cl.
*G03G 15/00* (2006.01)
*B41J 29/393* (2006.01)

(52) U.S. Cl.
CPC ........ *G03G 15/5016* (2013.01); *B41J 29/393* (2013.01)

(58) Field of Classification Search
CPC . G03G 15/5016; B41J 29/393; H04N 1/2032; H04N 1/4095
See application file for complete search history.

(56) References Cited

FOREIGN PATENT DOCUMENTS

JP 2015085587 A 5/2015

*Primary Examiner* — Hoang X Ngo
(74) *Attorney, Agent, or Firm* — IP Business Solutions, LLC.

(57) ABSTRACT

In an image forming apparatus, in a case of duplex printing, a sheet is transported toward an image forming device along a sheet transport route, the image forming device forms an image on a first face, which is one of faces of the sheet, a reverse transport device reverses the front and back faces of the sheet and transports the sheet to a position upstream of a show-through reading device in a sheet transport direction, and the show-through reading device reads a second face, which is another face of the sheet. Then the show-through detector decides whether a show-through has occurred, on a basis of the image that has been read.

7 Claims, 6 Drawing Sheets

IMAGE FORMING APPARATUS THE CONTROLS OPERATION DEPENDING ON WHETHER SHOW-THROUGH OF SHEET IS DETECTED

INCORPORATION BY REFERENCE

This application claims priority to Japanese Patent Application No. 2022-145594 filed on Sep. 13, 2022, the entire contents of which are incorporated by reference herein.

BACKGROUND

The present disclosure relates to an image forming apparatus capable of detecting show-through of a sheet.

In the case of a duplex printing operation, when an image formed on one face (e.g., front face) of the sheet is shown through to the other face (back face), the quality of an image formed on the other face may be affected. Accordingly, for example, some image forming apparatuses, designed to perform the duplex printing, include an image forming device that forms images on both of a first face and a second face of the sheet, and a reading device provided downstream of the image forming position of the image forming device in the sheet transport direction, and configured to read the image from the side of the first face, to thereby detect the show-through.

SUMMARY

The disclosure proposes further improvement of the foregoing techniques.

In an aspect, the disclosure provides an image forming apparatus including a plurality of sheet cassettes, a sheet transport route, an image forming device, a show-through reading device, a reverse transport device, an output tray, and a control device. In each of the plurality of sheet cassettes, sheets are to be stored. The sheet transport route is for transporting the sheet from the sheet cassette. The image forming device forms an image on the sheet transported along the sheet transport route. The show-through reading device is provided upstream of the image forming device in a sheet transport direction, and configured to read a sheet face of the sheet being transported to the image forming device. The reverse transport device reverses front and back faces of the sheet on which the image forming device has formed the image, and transports the sheet to a position upstream of the show-through reading device, in the sheet transport direction. The output tray receives the sheet on which the image has been formed. The control device includes a processor, and acts as a show-through detector and a controller, when the processor executes a control program. The show-through detector decides whether a show-through has occurred, on a basis of the image read by the show-through reading device. The controller controls an image forming operation, according to a printing job. In a case of duplex printing, the controller causes the sheet to be transported toward the image forming device along the sheet transport route, causes the image forming device to form an image on a first face, which is one of faces of the sheet, causes the reverse transport device to reverse the front and back faces of the sheet and transport the sheet to the position upstream of the show-through reading device in the sheet transport direction, and causes the show-through reading device to read a second face, which is another face of the sheet. The show-through detector decides whether the show-through has occurred, on a basis of the image that has been read.

DETAILED DESCRIPTION

Figure 1:
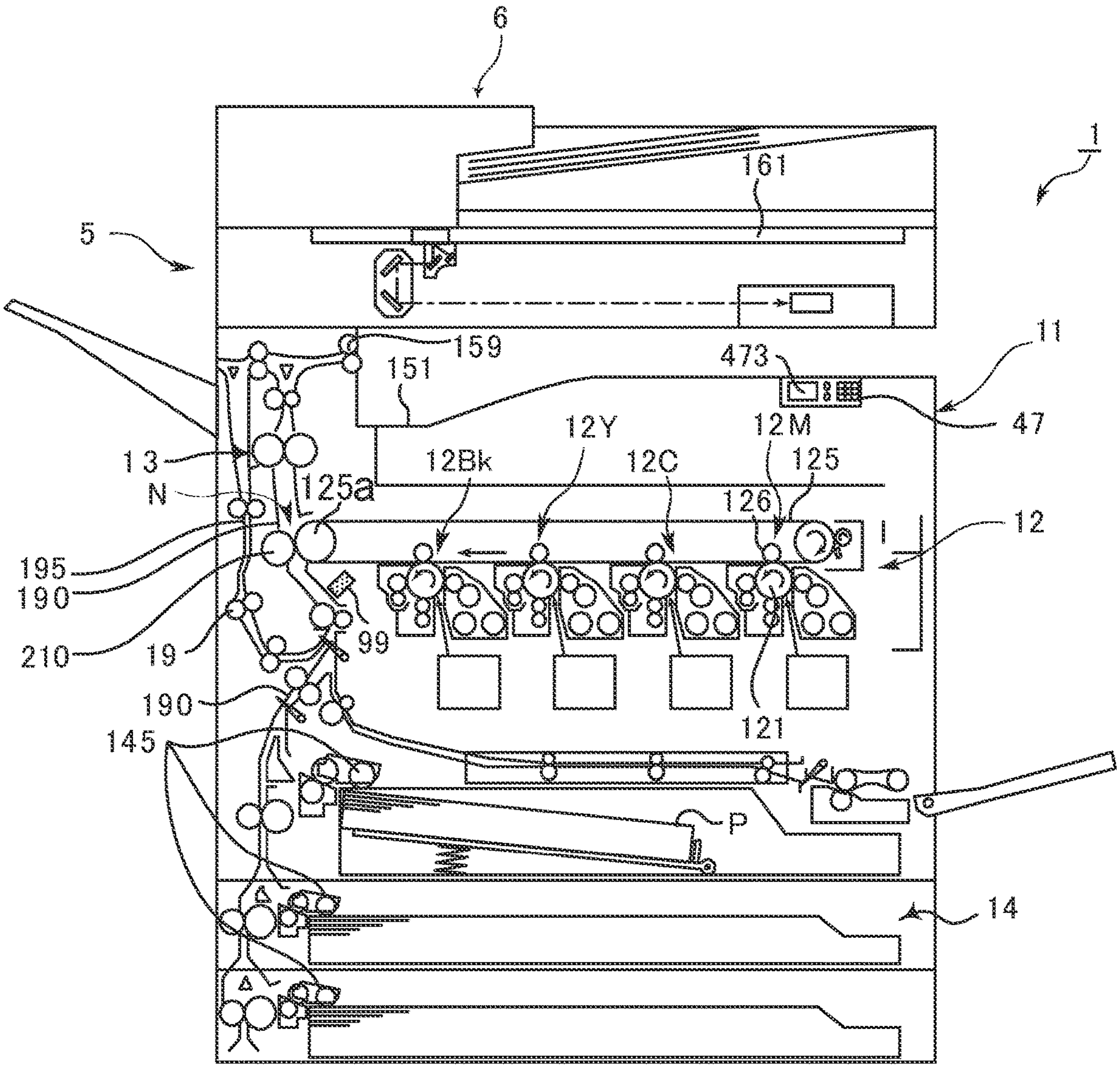
FIG. 1 is a front cross-sectional view showing a structure of an image forming apparatus.

Hereafter, an image forming apparatus according to an embodiment of the disclosure will be described, with reference to the drawings. FIG. 1 is a front cross-sectional view showing a structure of the image forming apparatus according to the embodiment of the disclosure. Here, although the image forming apparatus based on electrophotography is taken up as the example in the following embodiment, the disclosure is also applicable to an image forming apparatus configured to perform ink jet printing.

The image forming apparatus 1 according to the embodiment of the disclosure is a multifunction peripheral having a plurality of functions, such as copying, printing, scanning, and facsimile transmission, or a single-function image forming apparatus such as a copier, a printer, or a facsimile machine, but configured to execute duplex printing. Although a color image forming apparatus is taken up in the following embodiment, the disclosure is also applicable to a monochrome image forming apparatus.

The image forming apparatus 1 includes, inside a main body 11, an input device 47, an image forming device 12, a fixing device 13, a sheet feeding device 14, a document feeding device 6, and an image reading device 5. The input device 47 receives user's instructions to execute the functions and operations that the image forming apparatus 1 is configured to perform, such as an image forming operation and an image reading operation. The input device 47 includes a display device 473 for displaying, for example, an operation guide for the user.

When the image forming apparatus 1 performs the document reading operation, the image forming apparatus 1 operates as follows. The image reading device 5 optically reads the image on the source document, delivered from the document feeding device 6, or placed on a platen glass 161, and generates image data. The image data generated by the image reading device 5 is stored, for example, in a built-in HDD of a computer connected via a network.

When the image forming apparatus 1 performs the image forming operation, the image forming device 12 forms a toner image on a sheet P, serving as a recording medium, and supplied from the sheet feeding device 14, on the basis of the image data generated through the document reading operation. In the case of color printing, an image forming unit 12M for magenta, an image forming unit 12C for cyan, an image forming unit 12Y for yellow, and an image forming unit 12Bk for black in the image forming device 12 each form a toner image on a photoconductor drum 121 on the basis of the image formed of the corresponding color component, through charging, exposing, and developing processes, and such toner image is transferred onto an intermediate transfer belt 125, via a primary transfer roller 126.

The toner images of the respective colors are superposed at an adjusted timing on the intermediate transfer belt 125, upon being transferred thereon, so as to form a colored toner image. A secondary transfer roller 210 transfers the colored toner image formed on the surface of the intermediate transfer belt 125, onto the sheet P transported along a sheet transport route 190 from the sheet feeding device 14, at a nip region N between a drive roller 125*a* and the intermediate transfer belt 125. Then the fixing device 13 fixes the toner image on the sheet P, by thermal compression. Upon undergoing the fixing process, the sheet P having the colored image formed thereon is delivered to an output tray 151. Here, the image forming operation performed by the image forming device 12 may also be referred to as a printing operation.

The sheet feeding device 14 includes a plurality of sheet cassettes. A controller 101 (see FIG. 2) drives a pickup roller 145, provided for the sheet cassette in which the sheets P of the size designated by the user are stored, so as to rotate, so that the sheets P in the corresponding sheet cassette are transported toward the image forming device 12.

In the case where the image forming apparatus 1 performs the duplex printing, the sheet P having an image formed on one face (hereinafter, first face) thereof by the image forming device 12 is nipped between a delivery roller pair 159, which switches back the sheet P so as to deliver the sheet P to a reverse transport route 195, and the transport roller pair 19 transports the sheet P to a position upstream of a show-through reading device 99, to be subsequently described, in the sheet transport direction. The front and back faces of the sheet P are reversed by the switchback operation, and therefore the image forming device 12 forms an image on the other face (hereinafter, second face) of the sheet P.

The show-through reading device 99, which reads the image on the face of the sheet P, is provided on the upstream side of the image forming device 12, in the sheet transport direction. The show-through reading device 99 is, for example, an image scanner. In the duplex printing operation, the front and back faces of the sheet P are reversed by the switchback operation, after the image forming device 12 forms the image on the first face of the sheet P, and then the image forming device 12 forms the image on the second face of the sheet P. The show-through reading device 99 reads the second face of the sheet P, before the image forming device 12 forms the image on the second face of the sheet P. The show-through reading device 99 transmits the image that has been read to a show-through detector 102 (see FIG. 2), so that the show-through detector 102 decides whether a show-through has occurred. The detail of the show-through detection process will be subsequently described.

Figure 2:
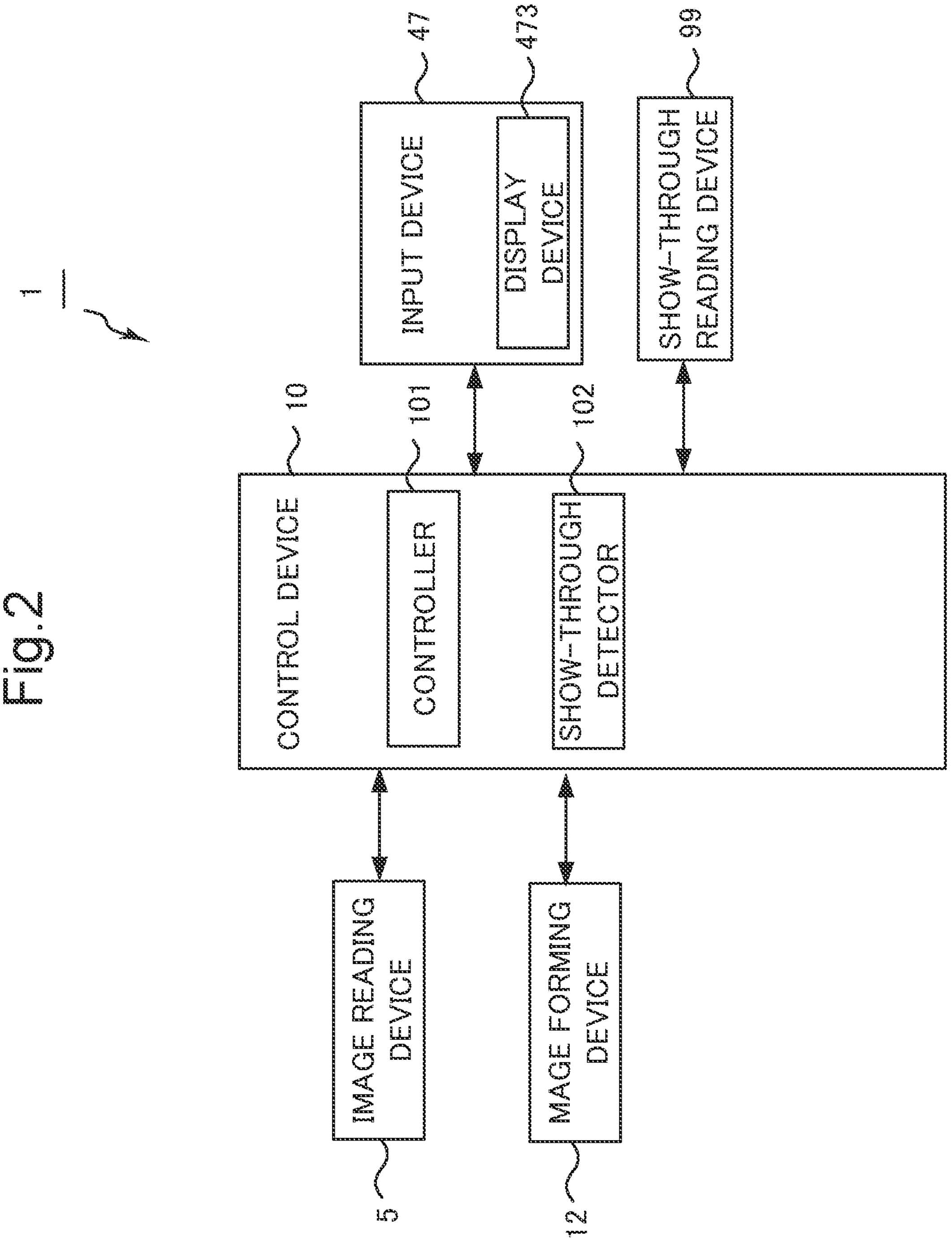
FIG. 2 is a functional block diagram showing an essential internal configuration of the image forming apparatus.

FIG. 2 is a functional block diagram showing an essential internal configuration of the image forming apparatus 1. The image forming apparatus 1 includes a control device 10, the image reading device 5, the image forming device 12, the input device 47, and a show-through reading device 99. Here, the description of the elements described with reference to FIG. 1 will not be repeated.

The control device 10 includes a central processing unit (CPU), a random-access memory (RAM), a read-only memory (ROM), and an exclusive hardware circuit, and serves to control the overall operation of the image forming apparatus 1. The control device 10 includes the controller 101 and the show-through detector 102.

The control device 10 includes, as mentioned above, a processor, the RAM, and the ROM. The processor is, for example, the CPU, an MPU, or an ASIC. The control device 10 acts as the controller 101 and the show-through detector 102, when the processor executes a control program stored in the ROM. Here, the controller 101 and the show-through detector 102 may be constituted in the form of a hardware circuit, instead of being realized by the operation according to the control program.

The controller 101 controls the overall operation of the image forming apparatus 1. The show-through detector 102 detects whether show-through has occurred, on the basis of the image read by the show-through reading device 99.

Hereunder, the duplex printing operation without the show-through detection will be described. In the duplex printing operation performed by the image forming apparatus 1, an odd-numbered page of print data is printed on the front face, and an even-numbered page is printed on the back face, under the control of the controller 101. To be more specific, first the pickup roller 145 draws out the sheet P stored in the sheet cassette, and the roller pair provided on the sheet transport route 190 transports the sheet P toward the image forming device 12. Then the image forming device 12 forms the image of the back face (image on the even-numbered page), on the first face of the sheet P. In other words, the image of the back face is printed first.

Thereafter, the sheet P is switched back so that the front and back faces are reversed, and again transported to the image forming device 12. Then the image forming device 12 forms the image of the front face (image on the odd-numbered page) on the second face of the sheet P. and the sheet P is delivered to the output tray 151. Delivering thus the sheet P to the output tray 151, after printing the back face image of the first face of the sheet P and printing the front face image on the second face, allows the sheets P that have undergone the printing operation to be accumulated on the output tray 151 in the order of the pages, when the duplex printing is performed over a plurality of pages.

In this embodiment, it will be assumed that, in the case of the duplex printing, the back face image is to be printed first. However, depending on the location or orientation of the output tray 151 of the image forming apparatus, the sheets P that have undergone the printing operation may be accumulated in the order of the pages, by printing the front face image first and then the back face image.

Figure 3:
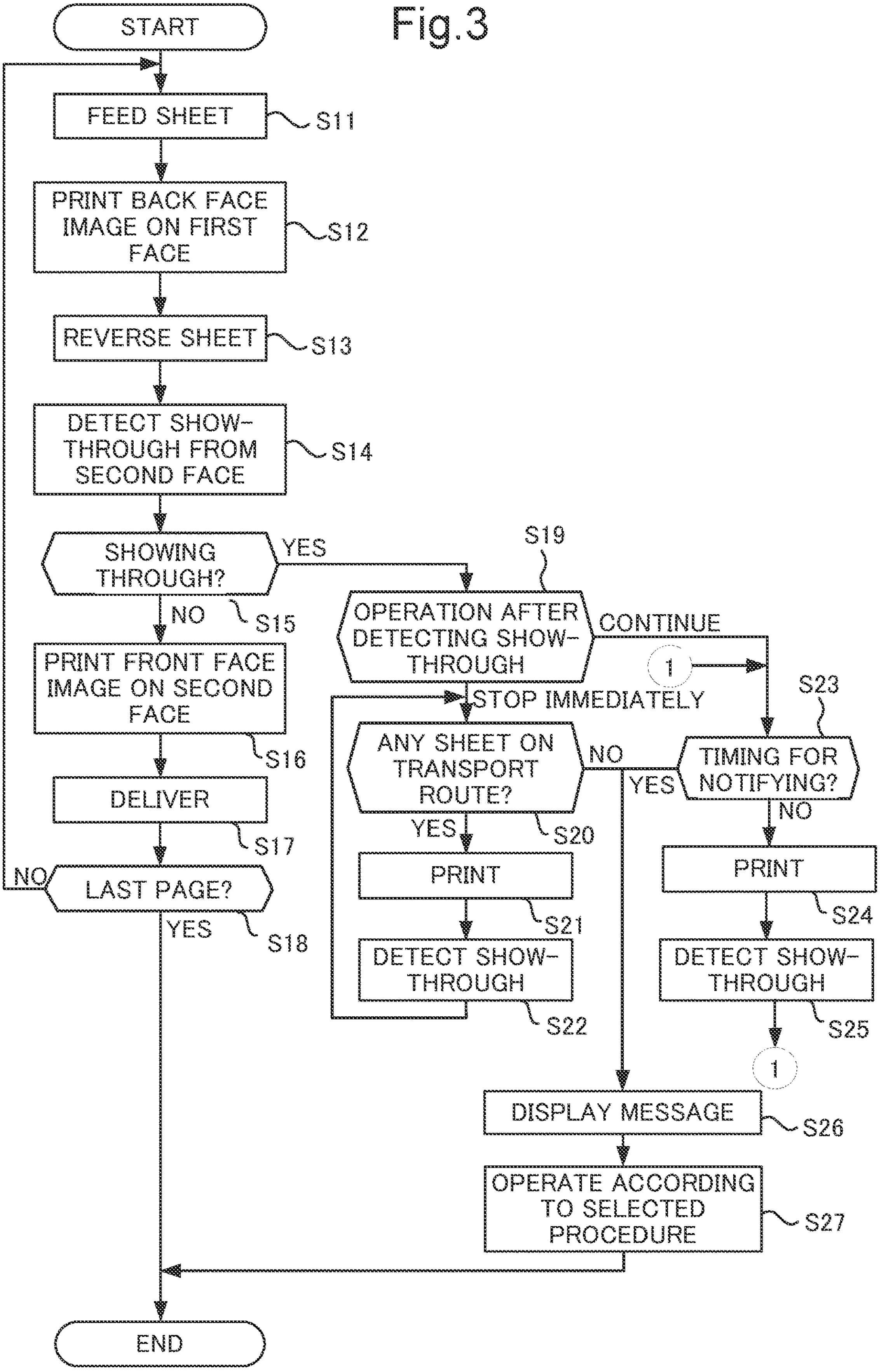
FIG. 3 is a flowchart for explaining a duplex printing operation including show-through detection.
Figure 4:
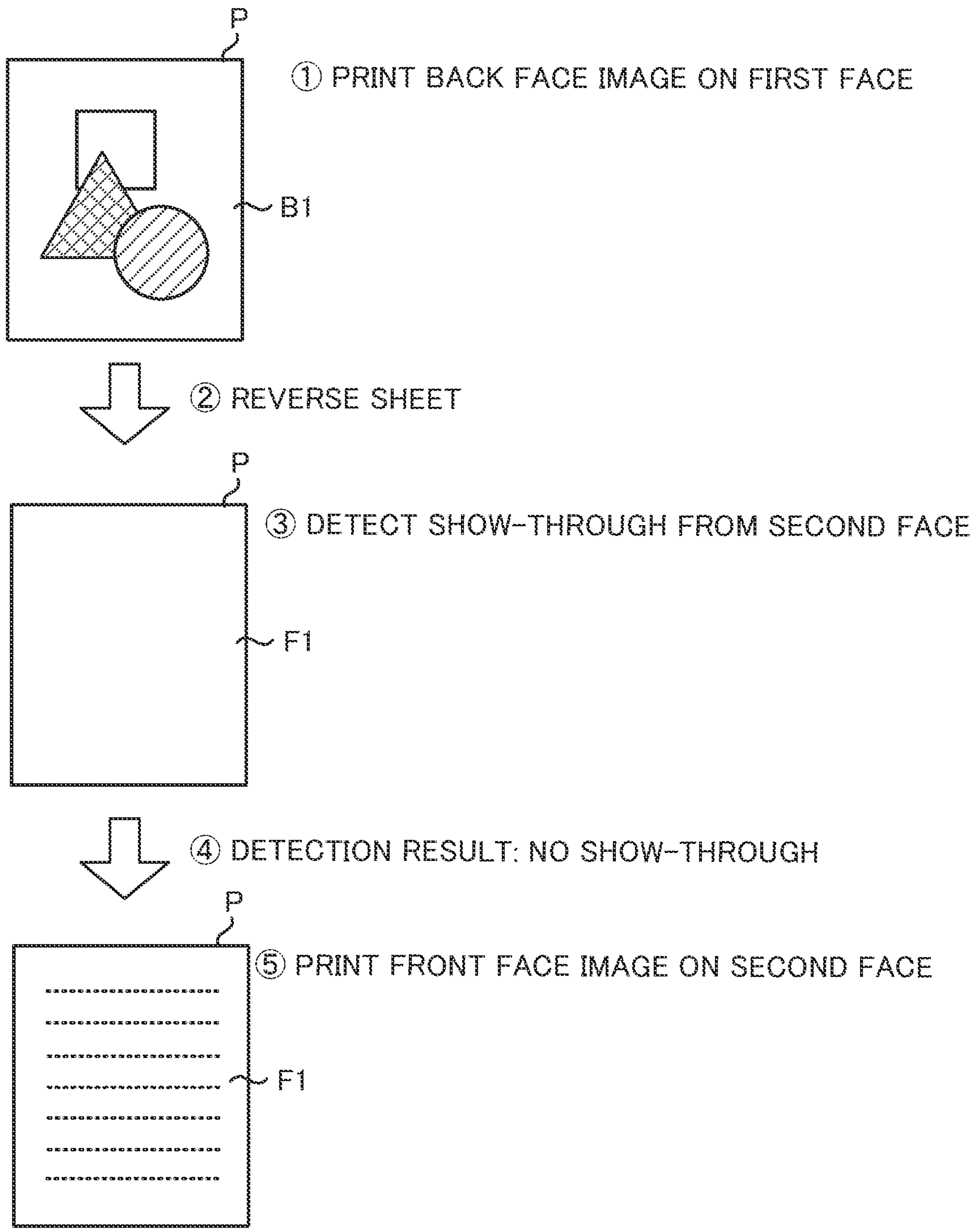
FIG. 4 is a schematic drawing for explaining images on the front face and the back face of a sheet.
Figure 5:
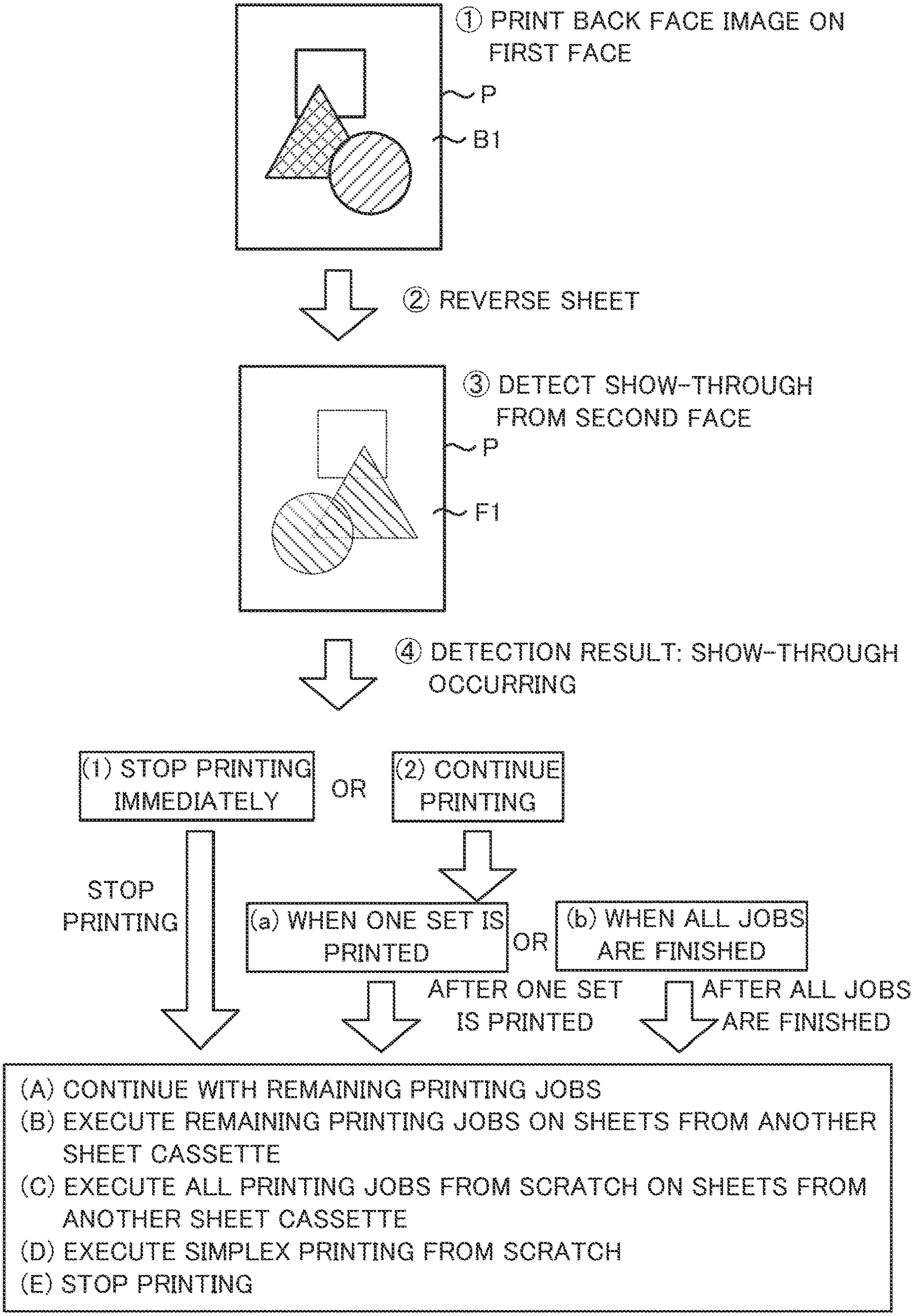
FIG. 5 is a schematic drawing including a flowchart, for explaining images on the front face and the back face of the sheet.
Figure 6:
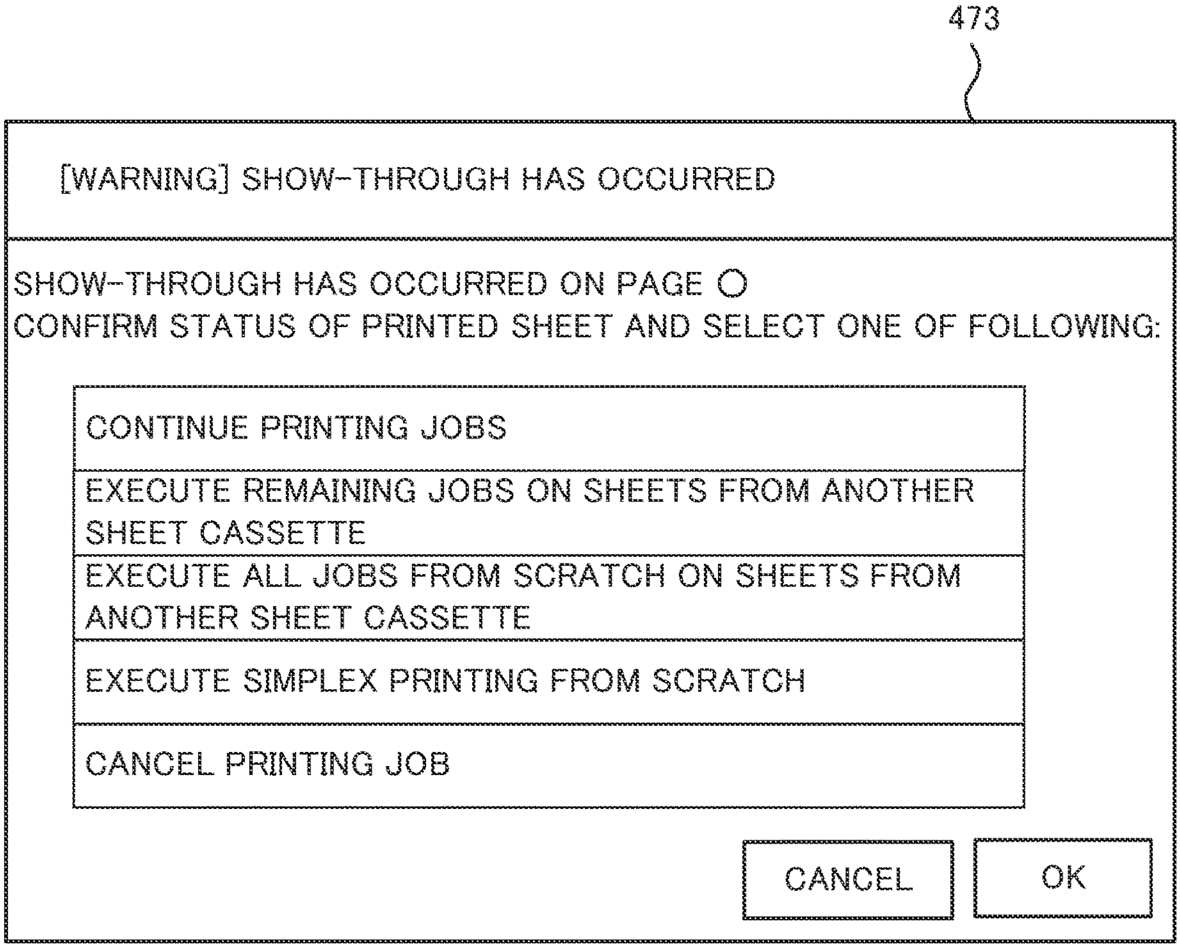
FIG. 6 is a schematic drawing showing an example of a message displayed on a display device.

FIG. 3 is a flowchart for explaining the duplex printing operation including the show-through detection. FIG. 4 and FIG. 5 are schematic drawings for explaining the images on the front face and the back face of the sheet P1. FIG. 6 is a schematic drawing showing an example of the screen of the display device 473. Referring to FIG. 3 to FIG. 6, the show-through detection process will be described hereunder.

First, under the control of the controller 101, the pickup roller 145 draws out the sheet P stored in the sheet cassette, and the roller pair provided on the sheet transport route 190 transports the sheet P toward the image forming device 12 (S11). Then the image forming device 12 forms the back face image on a sheet face B1, which is the first face of the sheet P (S12).

Thereafter, also under the control of the controller 101, the sheet P is switched back so that the front and back faces thereof are reversed (S13), and transported to the upstream side of the show-through reading device 99 in the sheet transport direction, so that the show-through reading device 99 reads the sheet face F1, which is the second face of the sheet P. The controller 101 causes the show-through reading device 99 to output the image read as above to the show-through detector 102, which then decides whether a show-through has occurred, on the basis of the image received (S14).

Since an image has not yet been formed at this point, on the sheet face F1, which is the second face of the sheet P, and therefore no image can be seen on the sheet face F1, provided that the image formed on the sheet face B1 is not showing through (see sheet face F1 in FIG. 4). Accordingly, in the case where the image data acquired through the reading operation by the show-through reading device 99 represents a blank, or a nearly blank image, the show-through detector 102 decides that the show-through has not occurred.

When the show-through detector 102 decides that the show-through has not occurred (NO at S15), the controller 101 causes the image forming device 12 to form the front face image on the sheet face F1, which is the second face of the sheet P (S16), and the sheet P is delivered to the output tray 151 (S17). In the case where the controller 101 decides at this point that the image of the last page has been printed (YES at S18), the controller 101 finishes the duplex printing operation. In the case where the controller 101 decides that the image of the last page has not been printed yet (NO at S18), the operation returns to S11.

On the other hand, when the image data acquired through the reading operation by the show-through reading device 99 does not represent a blank image, but represents a kind of image as shown in FIG. 5, the show-through detector 102 decides that the show-through has occurred (YES at S15). At this point, the show-through detector 102 stores the page number of the image detected as showing through, in the memory.

Then the controller 101 proceeds the operation according to a predetermined procedure after the detection of the show-through (S19). As the action after the detection of the show-through, the user can specify in advance one of (i) and (ii) below, through the input device 47.

(i) Stop printing immediately (Stopping mode)

(ii) Continue with printing (Continuing mode)

Upon deciding, when the show-through detector 102 decides that the show-through has occurred (YES at S15), that (i) "Stop printing immediately" is specified ("Stop Immediately" at S19), the controller 101 further decides whether a sheet is present on the sheet transport route 190 at this point (S20). A plurality of sensors (not shown) that detect the presence of the sheet are provided on the sheet transport route 190, to adjust the transport timing of the sheet, or to detect occurrence of paper jam. The controller 101 decides whether the sheet is present on the sheet transport route 190, with such sensors.

Upon deciding that the sheet is present on the sheet transport route 190 (YES at S20), the controller 101 causes the image forming device 12 to form an image on the sheet present on the sheet transport route 190 (S21), and the show-through reading device 99 reads the second face of the sheet passing by, so that the show-through detector 102 detects whether a show-through has occurred (S22). At this point, the show-through detector 102 stores the page number of the image detected as showing through at S15 and S22.

The controller 101 repeats the operation of step S20 to step S22 until the sheets on the sheet transport route 190 run out, and when the sheets on the sheet transport route 190 run out (NO at S20), the controller 101 causes the display device 473 to display a message notifying the user that the show-through has occurred (S26). At the same time, the controller 101 causes the display device 473 to also display the page number of the image detected as showing through, stored by the show-through detector 102, in addition to the message to the effect that the show-through has occurred.

On the other hand, when the show-through detector 102 decides that the show-through has occurred (YES at S15), and the controller 101 decides that (ii) "Continue with printing" is specified ("Continue" at S19), the controller 101 decides whether a timing for notifying that the show-through has occurred has been reached (S23). The timing for notifying refers to the timing that the display device 473 displays the message for notifying the user that the show-through has occurred, which is set to one of (a) and (b) below. The user can specify in advance one of (a) and (b), through the input device 47.

(a) When printing of one set is finished (Set printing mode)

(b) When all printing jobs are finished (All printing mode)

Upon deciding that the timing for notifying that the show-through has been detected is set to (a) "When printing of one set is finished", the controller 101 causes the image forming device 12 to continue with the printing operation until the printing of a predetermined set of a plurality of pages to be printed is finished (S24), and the show-through reading device 99 reads the second face of the sheets passing by, so that the show-through detector 102 detects whether a show-through has occurred (S25). In other words, the controller 101 repeats the operation of step S23 to step S25, until the printing of the predetermined set of the plurality of pages to be printed is finished. In this process, the show-through detector 102 stores the page numbers of the images detected as showing through, at S15 and S22. In contrast, upon deciding that the timing for notifying that the show-through has been detected is set to (b) "When all printing jobs are finished", the controller 101 repeats the operation of step S23 to step S25, until all the printing jobs are completed. In this process, the show-through detector 102 stores the page numbers of the images detected as showing through, at S15 and S25.

Further, upon deciding that the prespecified timing for notifying has been reached (YES at S23), the controller 101 causes the display device 473 to display the message notifying the user that the show-through has occurred (S26). At the same time, the controller 101 causes the display device 473 to also display the page number of the image detected as showing through, stored by the show-through detector 102, together with the message to the effect that the show-through has occurred.

Thus, in the case of NO at S20 and YES at S23, the controller 101 causes the display device 473 to display, at step S26, a message urging the user to specify how the remaining printing jobs are to be executed after the show-through is detected, in addition to the message mentioned above. FIG. 6 illustrates the procedure that the user can select, through the input device 47.

The user can input, through the input device 47, the selection of the procedure of the remaining printing jobs, out of (1) to (5) below.

(1) Continue with remaining printing jobs (2) Execute remaining printing jobs on sheets from another sheet cassette (3) Execute printing jobs from scratch on sheets from another sheet cassette (4) Execute printing jobs from scratch by simplex printing (5) Stop printing When (1) "Continue with remaining printing jobs" is selected, the controller 101 causes the corresponding components of the image forming apparatus 1 to execute the remaining printing jobs as they are. When (2) "Printing on sheets from another sheet cassette" is selected, the controller 101 designates another sheet cassette, different from the one designated by the printing job, as the sheet feeding source, and causes the corresponding components to execute the remaining printing jobs. By preparing the sheets of different types (in terms of manufacturer or characteristics) in the respective sheet cassettes, the remaining printing jobs can be executed on the sheets of a different type, from the one that has incurred the show-through.

When (3) "Printing from scratch on sheets from another sheet cassette" is selected, the controller 101 designates another sheet cassette, different from the one designated by the printing job, as the sheet feeding source (i.e., to execute the printing on the sheet of a different type), and causes the corresponding components to execute the printing jobs from the beginning. When (4) "Printing from scratch by simplex printing" is selected, the controller 101 causes the corresponding components to execute the printing jobs by simplex printing, instead of the duplex printing. When (5) "Stop printing" is selected, the controller 101 suspends the printing job.

Allowing thus the user to select one of the plurality of methods, with respect to the printing jobs that immediately follow after the show-through has been detected, improves the user-friendliness of the image forming apparatus 1 and upgrades the productivity in the printing operation.

According to this embodiment, as described thus far, in the case of the duplex printing operation the front and back faces of the sheet are reversed after the image is printed on the first face, the show-through reading device 99 reads the second face before an image is formed on the second face, the show-through detector 102 decides whether the show-through has occurred, and the image forming device 12 forms the image on the second face in the case where the show-through has not been detected, thus finishing the duplex printing operation. With such arrangement according to this embodiment, the show-through can be detected at an early stage, before an image is formed on the second face, in the duplex printing operation, and the necessary measures can be taken at this point, for example suspending the printing operation. Therefore, the waste of the toner or ink can be reduced, and the number of uselessly printed sheets can also be reduced, which leads to improved productivity in the printing operation.

For example, in the case of the existing image forming apparatuses, in winch the image forming device forms the image on both of the first face and the second face, and the reading device, provided downstream of the image forming position by the image forming device in the sheet transport direction, reads the image from the side of the first face thereby detecting the show-through, the detection of the show-through is performed after the printing on both faces is finished. Accordingly, it takes time to detect the show-through, and although the show-through is detected, the printing has already been executed on both faces, at the time of the detection. Therefore, a larger amount of toner or ink is wasted, resulting in degraded productivity in the printing operation. With the arrangement according to the foregoing embodiment, in contrast, in the duplex printing operation the show-through can be detected at an early stage, by the show-through reading device 99, provided upstream of the image forming position in the sheet transport direction, and therefore, as described above, the waste of the toner or ink can be reduced, which leads to improved productivity in the printing operation.

Here, although the detection of the show-through in the duplex printing operation is performed only from one side of the sheet, in the foregoing embodiment, the controller 101 may adopt a test print mode, which includes detecting the show-through from both sides.

The test print mode includes detecting the show-through not only from one side of the sheet, but from both sides, for example when an image likely to cause the show-through (e.g., a solid image) is to be subjected to the duplex printing, or when a printed product completely free from a show-through is required. The user can select and execute the test print mode, through the input device 47.

The controller 101 performs the test print mode, as follows. First, the image forming device forms the front face image on the first face of the sheet, and the show-through reading device 99 reads the second face of the sheet, after the front and back faces of the sheet are reversed, so that the show-through detector 102 decides whether the show-through has occurred. When the show-through is detected, the show-through detector 102 stores the page number of the image detected as showing through. Then the image forming device 12 forms the back face image on the second face of the sheet, and the front and back faces of the sheet are again reversed. The show-through reading device 99 reads the first face, and the show-through detector 102 decides whether the show-through has occurred. When the show-through is detected, the show-through detector 102 stores the page number of the image detected as showing through. The front and back faces of the sheet are further reversed, and the sheet that has undergone the duplex printing operation is delivered to the output tray 151. When the show-through detector 102 decides that the show-through has occurred, the display device 473 displays the message, together with the page number of the image detected as showing through.

When an image likely to cause the show-through is to be subjected to the duplex printing, or when a printed product completely free from a show-through is required, the user can print, for example only one sheet by the test print mode, to confirm whether the show-through occurs. In this case, provided that the show-through has not occurred, the user can perform the ordinary duplex printing when a plurality of sheets are to be printed, and surely and efficiently obtain the printed products free from the show-through.

The disclosure may be modified in various manners, without limitation to the configuration according to the foregoing embodiment. For example, although the image forming apparatus described in the foregoing embodiment is based on electrophotography, the image forming apparatus according to the disclosure may be configured to perform ink jet printing. Further, the configurations and processings of the first and second embodiments, described with reference to FIG. 1 to FIG. 6, are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

a plurality of sheet cassettes in which sheets are to be stored;

a sheet transport route for transporting the sheet from the sheet cassette;

an image forming device that forms an image on the sheet transported along the sheet transport route;

a show-through reading device provided upstream of the image forming device in a sheet transport direction, and configured to read a sheet face of the sheet being transported to the image forming device;

a reverse transport device that reverses front and back faces of the sheet on which the image forming device has formed the image, and transports the sheet to a position upstream of the show-through reading device, in the sheet transport direction;

an output tray that receives the sheet on which the image has been formed; and a control device including a processor, and configured to act, when the processor executes a control program, as a show-through detector that decides whether a show-through has occurred, on a basis of the image read by the show-through reading device, and a controller that controls an image forming operation, according to a printing job, wherein, in a case of duplex printing, the controller causes:

the sheet to be transported toward the image forming device along the sheet transport route;

the image forming device to form an image on a first face, which is one of faces of the sheet;

the reverse transport device to reverse the front and back faces of the sheet and transport the sheet to the position upstream of the show-through reading device in the sheet transport direction; and the show-through reading device to read a second face, which is another face of the sheet, and the show-through detector decides whether the show-through has occurred, on a basis of the image that has been read, the controller causes, when the show-through detector decides that the show-through has not occurred, the image forming device to form an image on the second face of the sheet, and the show-through detector decides, when the image read by the show-through reading device represents a blank image, that the show-through has not occurred, and decides, when the image read by the show-through reading device does not represent the blank image, that the show-through has occurred.

2. The image forming apparatus according to claim 1, wherein, when performing the duplex printing, the controller causes the image forming device to form an image of a back face on the first face, causes the reverse transport device to reverse the front and back faces of the sheet and transport the sheet to the position upstream of the show-through reading device in the sheet transport direction, and causes the show-through reading device to read the second face of the sheet, and the show-through detector decides whether the show-through has occurred, on a basis of the image that has been read.

3. An image forming apparatus comprising:

a plurality of sheet cassettes in which sheets are to be stored;

a sheet transport route for transporting the sheet from the sheet cassette;

an image forming device that forms an image on the sheet transported along the sheet transport route;

a show-through reading device provided upstream of the image forming device in a sheet transport direction, and configured to read a sheet face of the sheet being transported to the image forming device;

a reverse transport device that reverses front and back faces of the sheet on which the image forming device has formed the image, and transports the sheet to a position upstream of the show-through reading device, in the sheet transport direction;

an output tray that receives the sheet on which the image has been formed; and a control device including a processor, and configured to act, when the processor executes a control program, as a show-through detector that decides whether a show-through has occurred, on a basis of the image read by the show-through reading device, and a controller that controls an image forming operation, according to a printing job, wherein, in a case of duplex printing, the controller causes:

the sheet to be transported toward the image forming device along the sheet transport route;

the image forming device to form an image on a first face, which is one of faces of the sheet;

the reverse transport device to reverse the front and back faces of the sheet and transport the sheet to the position upstream of the show-through reading device in the sheet transport direction; and the show-through reading device to read a second face, which is another face of the sheet, and the show-through detector decides whether the show-through has occurred, on a basis of the image that has been read, wherein the controller executes control, when the show-through detector detects the show-through, in a stopping mode including stopping a printing job being executed, and a continuing mode including continuing with execution of the printing job, and stops the printing job, when the show-through detector detects the show-through in the stopping mode, after causing the image forming device to form an image only on the sheet being transported along the sheet transport route.

4. The image forming apparatus according to claim 3, wherein the controller executes control, when the continuing mode is set to form images on a predetermined set of a plurality of pages as the printing job, in one of a set printing mode including temporarily suspending the printing job, when the image forming on the set is finished, and an all printing mode including completely executing the printing job to an end.

5. The image forming apparatus according to claim 4, further comprising a display device, wherein, in a case where the controller is executing the continuing mode when the show-through detector has detected the show-through, the controller causes the show-through detector to store a page number of an image detected as showing through, and causes the display device to display the page number stored by the show-through detector, in addition to a message to an effect that the show-through has been detected.

6. The image forming apparatus according to claim 5, wherein, in the case where the controller is executing the continuing mode when the show-through detector has detected the show-through, the controller causes the display device, in a case of executing the control in the set printing mode, to display the page number stored by the show-through detector, in addition to the message to the effect that the show-through has been detected, after the image forming on the set is finished, and the controller causes the display device, in a case of executing the control in the all printing mode, to display the page number stored by the show-through detector, in addition to the message to the effect that the show-through has been detected, after completely executing the printing job to the end and finishing all the image forming operation.

7. The image forming apparatus according to claim 3, further comprising:

a display device that displays a message; and an input device that receives an input of an instruction from a user, wherein the controller causes the display device to:

display a message to an effect that the show-through has been detected, after the show-through detector detects the show-through and the printing job being executed is temporarily suspended, or after the printing job is completely executed to an end; and display options for selecting one of (1) continuing with remaining printing jobs on the sheets from the sheet cassette designated by the printing job, (2) executing the remaining printing jobs on the sheets from another sheet cassette, different from the sheet cassette designated by the printing job, (3) execute the printing jobs from scratch on the sheets from another sheet cassette, different from the sheet cassette designated by the printing job, (4) executing the printing jobs from scratch by simplex printing, and (5) stopping the printing job, and when one of the options is inputted through the input device, the controller controls the image forming operation, according to the option received by the input device.

* * * * *